United States Patent
Voegele, Jr. et al.

(10) Patent No.: US 8,443,565 B2
(45) Date of Patent: May 21, 2013

(54) INTERNAL STRUCTURAL MULLION FOR STANDING SEAM PANEL SYSTEM

(75) Inventors: William P. Voegele, Jr., Pittsburgh, PA (US); Kevin P. Smith, Glenshaw, PA (US)

(73) Assignee: Extech/Exterior Technologies, Inc., Pittsburgh, PA (US)

( * ) Notice: Subject to any disclaimer, the term of this patent is extended or adjusted under 35 U.S.C. 154(b) by 0 days.

(21) Appl. No.: 13/539,705

(22) Filed: Jul. 2, 2012

(65) Prior Publication Data

US 2012/0272599 A1 Nov. 1, 2012

Related U.S. Application Data

(62) Division of application No. 12/625,956, filed on Nov. 25, 2009, now Pat. No. 8,256,181.

(60) Provisional application No. 61/118,703, filed on Dec. 1, 2008, provisional application No. 61/226,875, filed on Jul. 20, 2009.

(51) Int. Cl.
*E04D 1/34* (2006.01)

(52) U.S. Cl.
USPC ........... 52/543; 52/489.1; 248/71; 248/228.1; 248/231.61; 248/226.11; 403/256; 403/DIG. 9

(58) Field of Classification Search
USPC ................... 52/543–545, 235, 24–26, 582.1, 52/489.1; 248/71, 228.1, 228.5, 231.61, 266.11; 403/168, 256, 388, DIG. 9; 24/488, 514, 24/525, 569; 267/250, 289, 291; 269/34, 269/45, 239
See application file for complete search history.

(56) References Cited

U.S. PATENT DOCUMENTS

| | | | |
|---|---|---|---|
| 4,222,210 A | 9/1980 | Hanstein | |
| 4,321,780 A | 3/1982 | Hooper et al. | |
| 4,332,119 A | 6/1982 | Toews | |
| 4,543,760 A | 10/1985 | Barker et al. | |
| 4,887,402 A | 12/1989 | Da Col | |
| 5,193,321 A | 3/1993 | Edwards | |
| 5,737,894 A | 4/1998 | Simpson et al. | |
| 6,164,024 A | 12/2000 | Konstantin | |
| 6,536,175 B2 | 3/2003 | Conterno | |
| 7,100,338 B2 | 9/2006 | Haddock | |
| 7,313,893 B2 | 1/2008 | Voegele, Jr. | |
| 7,546,708 B2 | 6/2009 | Konstantin | |
| 8,256,181 B2 | 9/2012 | Voegele, Jr. | |
| 2005/0217203 A1 | 10/2005 | Haddock | |
| 2008/0295425 A1 | 12/2008 | Farag | |

*Primary Examiner* — William Gilbert
(74) *Attorney, Agent, or Firm* — McKay & Associates, P.C.

(57) ABSTRACT

A standing seam panel system includes an internal structural mullion. A pair of panels meet at a joint and have standing flanges and detents. The mullion includes a main extrusion and a secondary extrusion, the main extrusion having an innermost portion, and a main hooked portion opposite the innermost portion. A secondary extrusion is attached to the main extrusion and has a leg hooked portion opposite the main hooked portion to form a pair of hooked portions, the hooked portions engaging the detents of the panels. Slotted holes are defined within said main extrusion, and screw fasteners pass through the slotted holes of the main extrusion and into a building substrate, wherein the innermost portion of the main extrusion is attached to a building substrate such that the mullion is adapted to move vertically along the building substrate to accommodate expansion or contraction of the panels.

7 Claims, 6 Drawing Sheets

INTERNAL STRUCTURAL MULLION FOR STANDING SEAM PANEL SYSTEM

CROSS-REFERENCE TO RELATED APPLICATIONS

The instant application is a divisional application of application Ser. No. 12/625,956 filed Nov. 25, 2009, now U.S. Pat. No. 8,256,181 which claimed benefit of provisional application Ser. No. 61/118,703 filed Dec. 1, 2008 and provisional application Ser. No. 61/226,875 filed Jul. 20, 2009, the disclosures of all of which are herein incorporated by reference.

BACKGROUND

1. Field of the Invention

The instant invention relates to the joining of panels that contain upright legs at their edges. In particular, described is an aluminum joining member, or mullion, which can span great distances and which allows for the free movement of the panels both pivotally about the mullion and vertically with respect to the substrate, while at the same time forming a water-tight seal.

2. Description of the Related Art

FIG. 1 shows a typical, prior art joint member. In the field of building materials composed of exterior panels which incorporate extensions in the form of legs or flanges along their sides, systems such as shown in FIG. 1 are available to join together two such panels. Drawbacks exist in these and other types of joining members.

U.S. Pat. No. 4,222,210 to Hanstein et al. teaches a conversion muntin including a muntin cover element and a clamping strip. U.S. Pat. No. 4,332,119 to Toews shows a claw engaging means for rectangular panels. U.S. Pat. No. 6,164,024 to Konstantin describes a glazing panel system held together with a batten joining connector. U.S. Pat. No. 6,536,175 to Contero teaches an assembly of panels and jointing elements wherein the jointing element is U-shaped.

Prior art hooking portions can cause great pressure against the panels without leaving room for rotation of the panel elements relative to the clamping system. Furthermore, prior art systems are relatively weak when it comes to spanning between girts, and they cannot be notched when an architect does not want the glazing system to protrude too far from the plane of the wall girts. Finally, there are no provisions for accepting reinforcing steel bars and therefore the distances they span can be quite limited. These and other drawbacks are solved by the instant invention, as follows.

SUMMARY

This invention comprehends a mullion wherein, at a typical joint, two panels are firmly held but simultaneously allowed to expand or contract longitudinally relative to the aluminum members which hold them, while at the same time the mullion can span great distances with adequate support while further maintaining a water-tight seal.

It is therefore the objective of the instant invention to provide an aluminum joining member (mullion) which can be installed on a wall and wherein the mullion is initially partially open so as to easily receive the legs or flanges of the panels but also wherein the batten is designed to be flexible to the point where it can be drawn tightly to clamp upon the two legs of the panels.

It is further the objective to provide a two-piece mullion wherein when the mullion is closed (clamped), via the pressure of an internal screw system, a continuous gasket seal occurs at a level just inside the panels so as to form a barrier against the intrusion of water.

Another feature involves a series of detents at the innermost portion of the mullion to allow separate clips to engage those detents in such a way as to secure the mullion to a substrate (such as a horizontal girt) and still allow a sliding action to accommodate the thermal differential movement between the mullion and the substrate.

Yet another feature of the mullion includes a secondary extrusion which allows for the considerable widening of the hooking portions which engage the panels.

Accordingly, what is provided is an internal structural mullion for a standing seam panel system, comprising a main extrusion having an open side, an opposing closed side, an innermost portion, and a main hooked portion opposite the innermost portion. The main extrusion further comprises a cavity defined along the open side proximate to the innermost portion, and a screw track defined within the open side adapted to receive a screw. A secondary extrusion has a first leg portion, a medial leg portion, an end leg portion, and a leg hooked portion. A screw hole is defined through the medial leg portion positioned to be in alignment with the screw track of the main extrusion; and, the secondary extrusion further comprises a foot formed integral to the first leg portion and configured to seat within the cavity of the main extrusion. Thus, wherein upon insertion of the foot into the cavity, the leg hooked portion opposes the main hooked portion and the foot forms a fulcrum about which the secondary extrusion can bend away from the main extrusion and be tightened or loosened by the tightening or loosing of the screw, as a result forming a two-piece clamp for engaging panels of the panel system with variable pressure.

DETAILED DESCRIPTION OF THE PREFERRED EMBODIMENT

Figure 1:
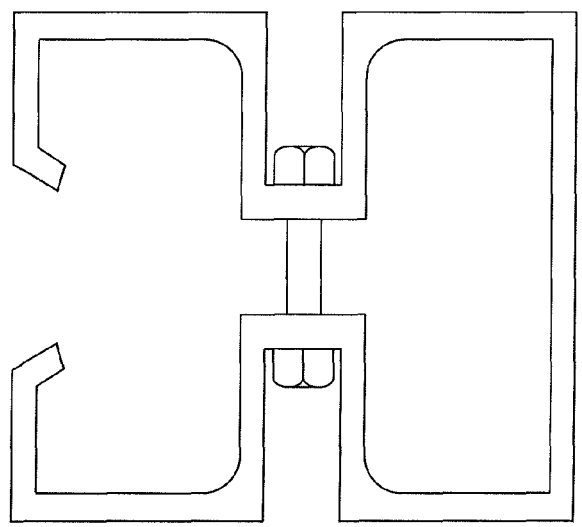
FIG. 1 shows a prior art mullion.
Figure 2:
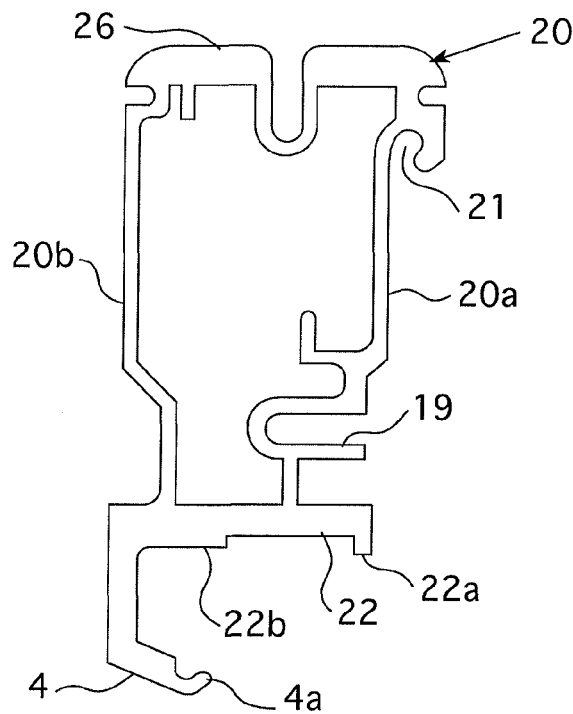
FIG. 2 shows a top cross-section of the instant invention's main extrusion.
Figure 3:
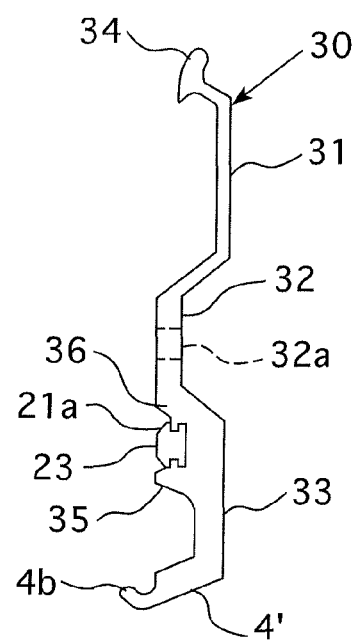
FIG. 3 shows a top cross-section of the instant invention's secondary extrusion.
Figure 4:
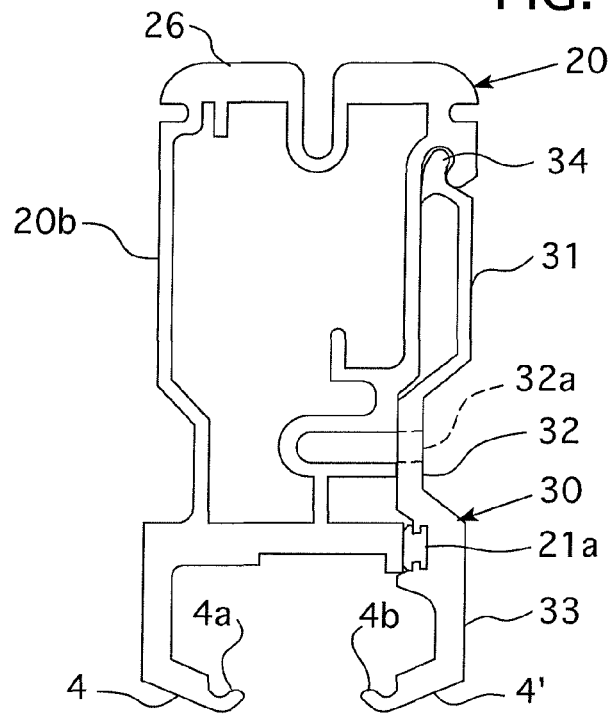
FIG. 4 shows a top cross-section of the main mullion assembled with joined main extrusion and secondary extrusion.

FIG. 1 shows a prior art panel joining member comprising two hooked portions. The panel joining member is one, integral piece having a bolt and nut which, when tightened, limits hooked portions. Of note is that the pressure provided by the joining member in this configuration is not easily made variable, not readily accessible, and as located, the range of panel-applied pressure is limited.

Figure 5:
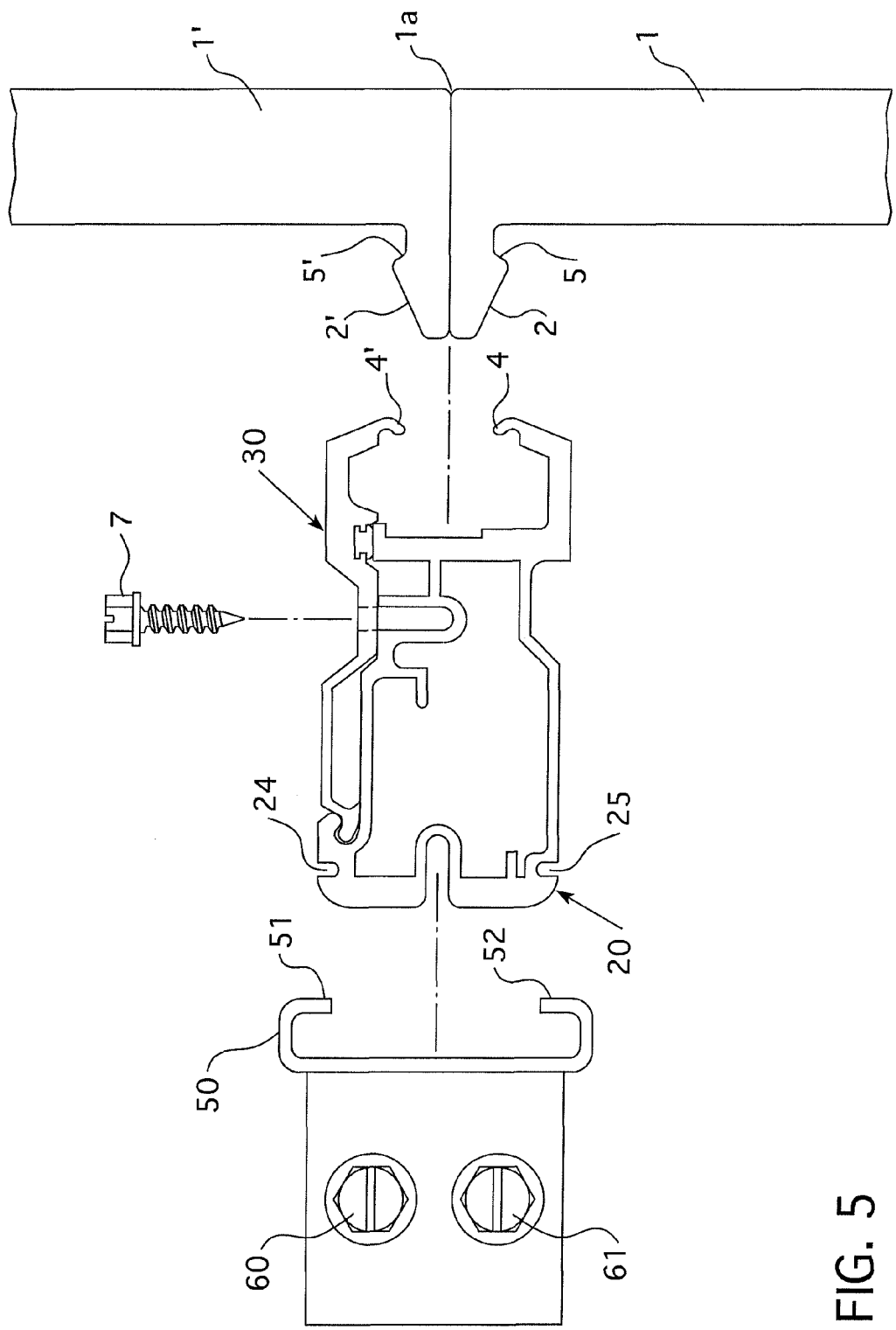
FIG. 5 shows a top cross-section of the assembled mullion exploded to show the relation to a fastener, clamping screw, and panels.
Figure 6:
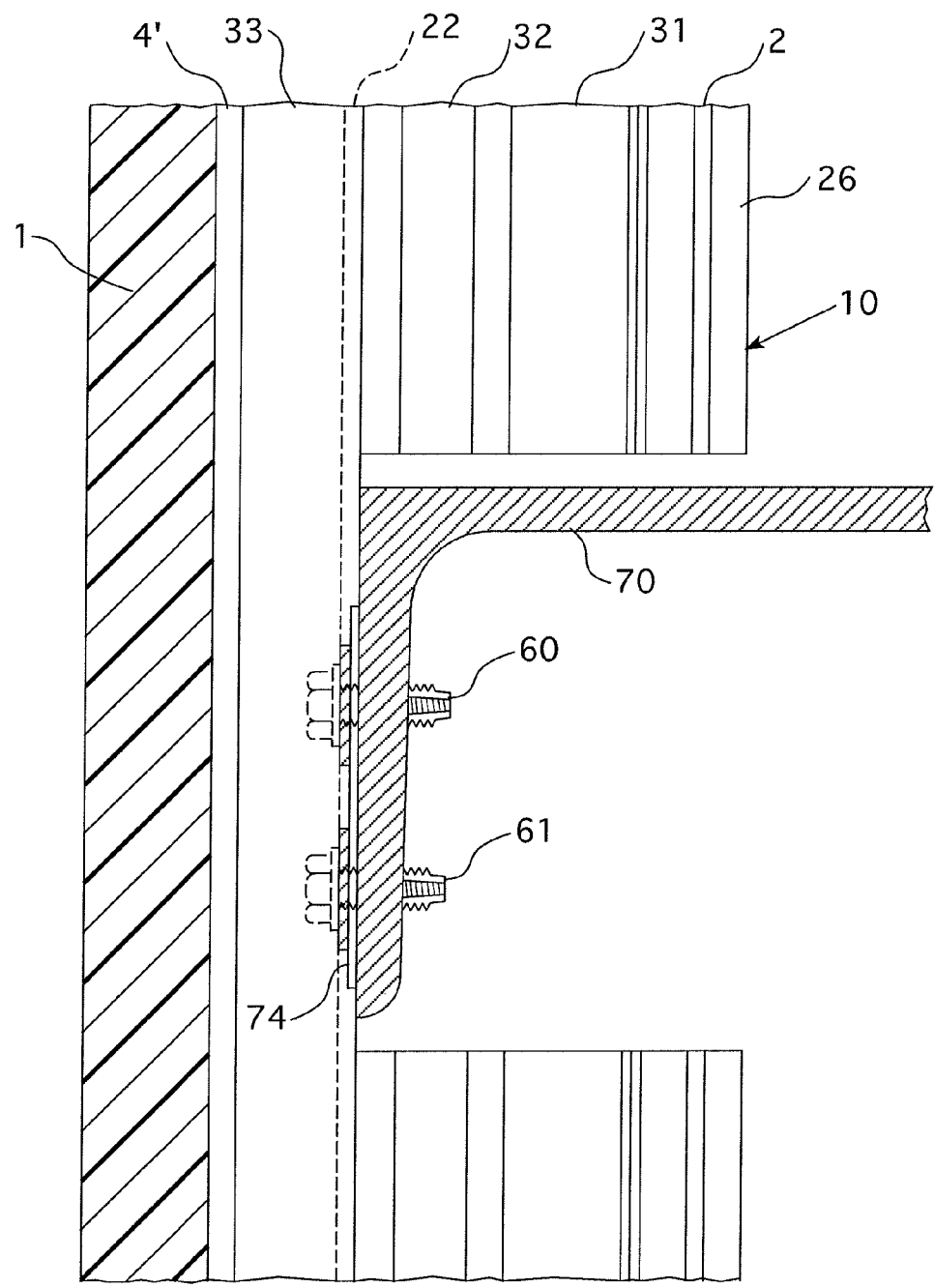
FIG. 6 shows a side elevation view of the assembled mullion fastened to a girt after notching of the mullion assembly.
Figure 7:
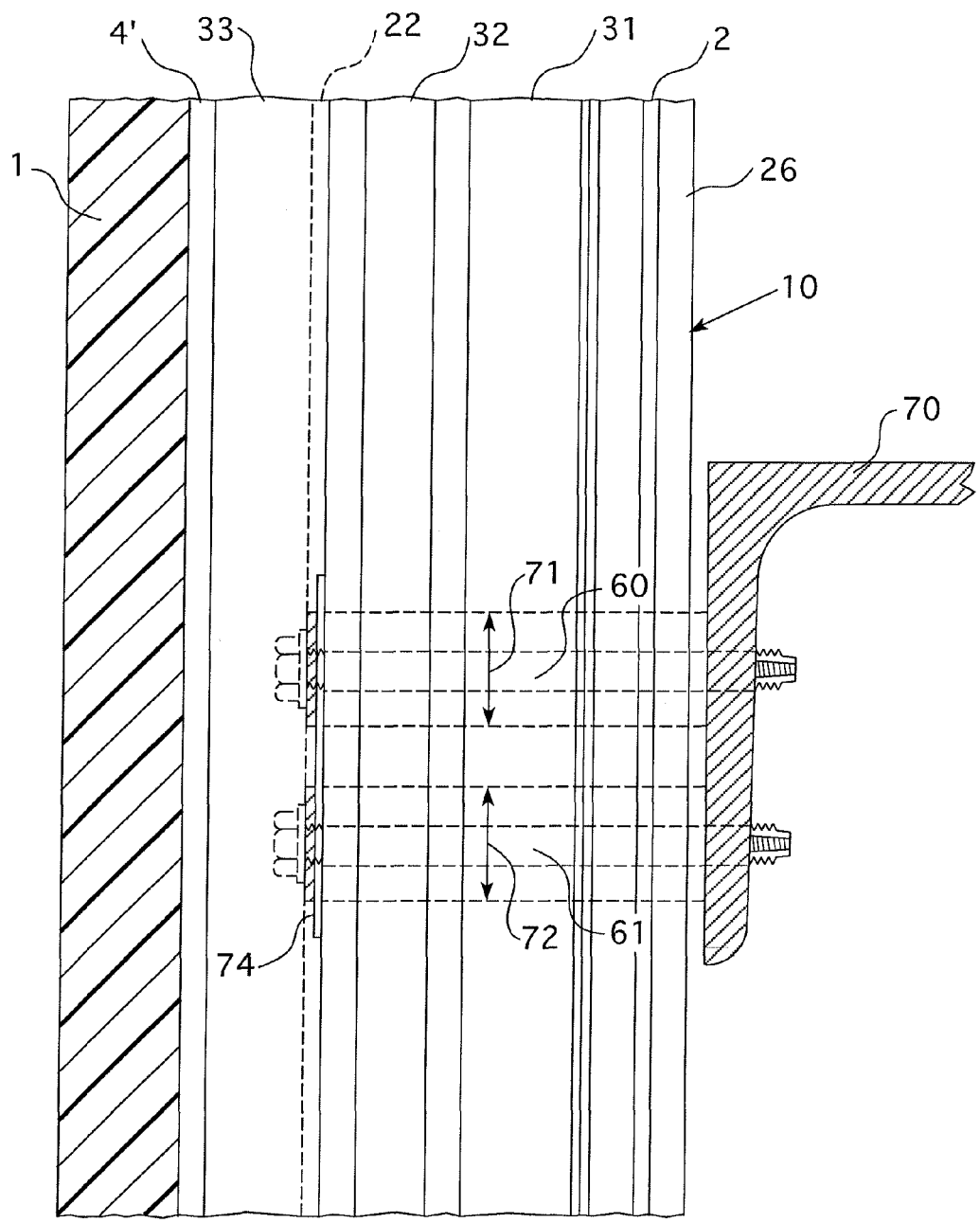
FIG. 7 shows a side elevation view of the assembled mullion fastened to a girt without notching.

With reference then to FIGS. 2-7 representing the instant invention, the instant mullion includes an extruded, main mullion piece or main extrusion 20 and a secondary extrusion 30, thus being a two-piece assembly. The extrusions 20, 30 typically travel the entire height of the panels and are made of metal such as aluminum, but they can be constructed of any rigid polymer or composite. Since typically running the height of the panels, one or more of the views of the drawings are depicted in cross-section and the side elevational views of FIGS. 6 and 7 show only one fastening point. Accordingly, "a" as used in the specification and claims as it relates to components including but not limited screws, tracks, washers, and holes may mean one or more because there typically will be a plurality of components along the entire height of the mullion and panel.

Main extrusion 20 has an innermost portion 26 which is innermost relative to a wall of a building or the like, and main hooked portions 4, 4' at the opposite end, furthest away from building. Main extrusion 20 also has an open side 20a and a closed side 20b. Closed side 20b refers to the side of the main extrusion 20 which does not receive any additional components. Open side 20a, opposing closed side 20b, is configured to receive the secondary extrusion 30. To receive secondary extrusion 30, main extrusion 20 includes a cavity 21 defined along the open side 20a, as further described.

Secondary extrusion 30 has a first leg portion 31, a medial leg portion 32, an end leg portion 33, and a foot 34 defined integral with the first leg portion 31. Medial leg portion 32 is offset from the first leg portion 31 to generally be non-coplanar. End leg portion 33 is substantially co-planar with first leg portion 31 and thus offset from the medial leg portion 32. Foot 34 of secondary extrusion 30 is placed within cavity 21 of main extrusion 20, resulting in a hinge-like fulcrum by which secondary extrusion 30 is adapted to bend away from main extrusion 20 and thus widen the gap formed between the hooking portions 4, 4' while still being maintained on main extrusion 20. Accordingly, the secondary extrusion 30 forming part of the assembled mullion is removably inserted into the main extrusion 20. Of note also is that using the instant two-piece configuration with a hinge-like fulcrum, the secondary extrusion 30 is caused to spring open slightly relative to the main extrusion 20. This wide "open" position allows easy insertion of the panels 1, 1' (FIG. 5).

With reference to FIG. 5, as above, the main extrusion 20 and the secondary extrusion 30 terminate, respectively, in the mirroring hooking portions 4, 4'. As part of the instant system typically at least a pair of the two panels 1 and 1' meet at a joint 1a, and the panels 1, 1' have standing flanges 2, 2' and detents 5, 5' near the bases of the flanges 2, 2'. Hooking portions 4, 4' therefore engage the detents 5, 5' of the panels 1, 1'. The main hooked portion 4 of the main extrusion 20 engages one detent 5. The hooked portion 4' of the secondary extrusion 30 engages the opposing detent 5', but only when a screw fastener 7 (which may be spaced approximately 12" o.c.) has been inserted and tightened. As designed, tips 4a and 4b of hooking portions 4 are generally U-shaped with a low profile relative to hooked portions 4, 4' to leave room for rotation of panels 1, 1' relative to the main extrusion 20 and secondary extrusion, as a result keeping the panels 1, 1' lodged but without excessive positive pressure.

A screw hole 32a is defined through the medial leg portion 32. A screw track 14 is defined within the open side 20a of main extrusion 20. Both components are adapted to receive a screw 7. Therefore, when screw 7 is driven tight through screw hole 32a in medial leg portion 32, secondary extrusion 30 engages the top of screw track 14, thus limiting the extent the hooking portions 4, 4' can exert pressure against the panels 1, 1'.

The main extrusion further comprises an internal leg 22 formed parallel to the screw track 14. Internal leg 22 spans a distance between the open side 20a and the closed side 20b of main extrusion 20. Internal leg 22 has two internal leg ends 22a, 22b. One end 22b is formed integral to the closed side 20b of main extrusion 20. The other internal leg end 22a terminates at the open side 20a to form a gasket-abutting end.

Secondary extrusion 30 includes opposing nubs 35, 36 formed below the end leg portion 33. In this manner a gasket seat 23 is defined. A rubber strip or similar gasket 21a is fixed within gasket seat 23. When screw fastener 7 is tightened as described above, gasket 21a is driven against internal leg end 22a of main extrusion 30, thus causing a water seal. Further, the connection between internal leg 22 with gasket 21 a restricts future movement of internal leg 22 either inward or outward relative to the building to enhance structural integrity.

Figure 5A:
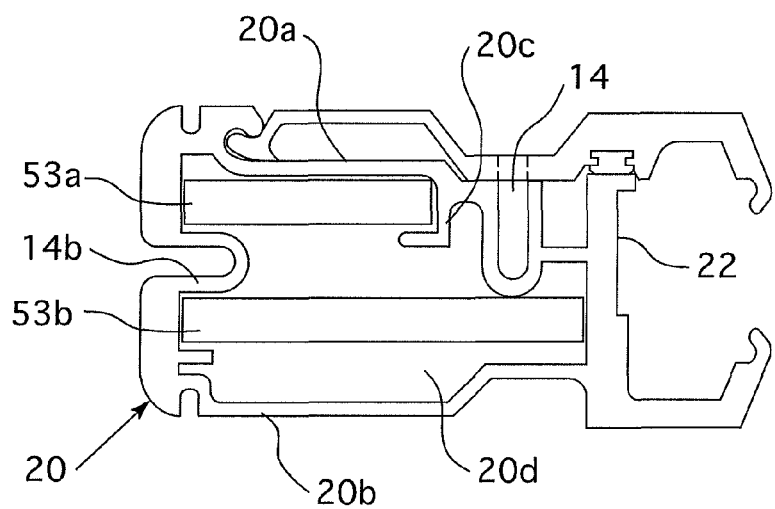
FIG. 5a shows a top cross-section of an embodiment of the mullion wherein the main extrusion is configured to receive one or more reinforcing steel bars.

With further reference to FIG. 5a, shown is an embodiment wherein the main extrusion 20 is configured to receive one or more reinforcing steel bars 53a, 53b. Main extrusion 20 is hollow to define extrusion interior 20d. L-shaped finger 20c abuts open side 20a adjacent to screw track 14. L-shaped finger 20c is configured to capture one end of a small reinforcing bar 53a, while the other end of small reinforcing bar 53a is situated abutting innermost portion 26 of main extrusion 20 between alternate screw track 14b and open side 20a. A larger reinforcing bar 53b can also be situated generally parallel to small reinforcing bar 53a within extrusion interior 20d having one end situated between the other side of alternate screw track 14b and closed side 20b, with its other end situated between screw track 14 and closed side, proximate to internal leg 22. As herein defined, "alternate screw track 14b" is configured similar to screw track 14 but it is positioned trans-axially to screw track 14. Alternate screw track 14b can be used for some building configurations which require or can accommodate certain interior fastening systems, but as shown it also serves as a means for spacing reinforcing bars 53a, 53b. Because the instant main extrusion 20 is adapted to contain reinforcing steel bars 53a, 53b, the system can span large distances with great strength.

Referencing again FIG. 5, and further FIGS. 6 and 7, at least one pair of slots 24, 25 are defined at the innermost portion 26 of main extrusion 20. Under certain conditions then, a clip 50 may be employed to engage slots 24, 25 for the purpose of fastening mullion to a building substrate. "Substrate" as defined herein means the building itself, a building column, or any structural member in a framed wall supported by a column such as a horizontal girt 70. Such fastening will take place via screw fasteners 60, 61 which pass through the clip 50 and into the substrate. The clip ends 51, 52 at the ends of clip 50 are smaller than slots 24, 25, thus allowing the mullion to move vertically, unrestricted, to accommodate expansion or contraction differences with the substrate. Of note is that in some instances clip 50 does not have to be used. But when there is no horizontal surface to screw to on the substrate, such as when the girt 70 is composed of an angle and a leg of the angle protrudes towards the outside of the building, clip 50 provides the transition.

As shown with reference to FIGS. 6 and 7, mullion 10 (main extrusion and secondary extrusion and all associated components assembled) rests directly against a typical girt 70 and is fastened to it via screws 60, 61. Said screws pass through slotted holes 71, 72, which are defined throughout internal leg 22 and innermost portion 26 along the height of the mullion 10. Slotted holes 71, 72 are offset from screw tracks 14 so that screws 61, 62 can penetrate unabated into extrusion interior 22d and through innermost portion 26 then into girt 70 while crossing above (or below) each screw track 14, 14b (notably screws 60, 61 would also travel between reinforcing steel bars 53a, 53b). Thus, because of slotted holes 71, 72, mullion 10 while fastened is allowed to move vertically in the event of expansion and contraction differences with the typical girt 70. A rectangular stainless steel washer 74 has two holes through which screws 60 and 61 can pass. The function of the stainless steel washer 74 is to bridge the gap caused by the slotted holes 71, 72 (See FIG. 7).

In FIG. 6, the mullion assembly has been notched to accommodate a condition wherein the mullion is required to extend outward only a short distance from the face of girt. In this case, fasteners will pass through slotted holes 71, 72 in the wall of mullion 10, the slots again being designed to allow vertical movement of the mullion relative to the substrate girt. Again, a stainless steel rectangular washer 74 is employed to cover the slotted openings. Of note is that because gasket 21a (FIGS. 2-5) is at a point just inboard of the panels, the water seal is viable in either the notched or full depth configurations.

We claim:

1. A standing seam panel system, comprising:
   at least a pair panels meeting at a joint, said panels have standing flanges and detents near bases of said flanges;
   a mullion including a main extrusion and a secondary extrusion, said main extrusion having an innermost portion, and a main hooked portion opposite said innermost portion, said secondary extrusion attached to said main extrusion and having a leg hooked portion opposite said main hooked portion to form a pair of hooked portions, said hooked portions engaging said detents of said panels;
   slotted holes defined within said main extrusion;
   screw fasteners passing through said slotted holes of said main extrusion and into a building substrate, wherein said innermost portion of said main extrusion is attached to a building substrate such that said mullion is adapted to move vertically along said building substrate to accommodate expansion or contraction of said panels.

2. The standing seam panel system of claim 1, wherein said main extrusion includes at least one pair of slots defined at said innermost portion.

3. The standing seam panel system of claim 2, further comprising a clip fixed to said building substrate, said clip providing a transition from said building substrate to said mullion.

4. The standing seam panel system of claim 3, wherein said clip has clip ends, each said clip end configured to pass into each of said slots to engage said mullion and allow said mullion to move vertically along said clip and thereby unrestricted along said substrate to accommodate for expansion or contraction of said panels.

5. The standing seam panel system of claim 1, further comprising a washer having washer holes through which said screw fasteners pass, said washer bridging a gap formed by said slotted holes.

6. The standing seam panel system of claim 1, wherein a notch is defined in said mullion to allow said mullion to be used when said mullion may extend outward away from said substrate only a short distance.

7. The standing seam panel system of claim 1, wherein said hooked portions include tips being generally U-shaped and of a low profile relative to said hooked portions to leave room for rotation of said panels, as a result keeping the panels lodged but without excessive positive pressure.

* * * * *